United States Patent
Croak et al.

(10) Patent No.: US 8,730,952 B2
(45) Date of Patent: *May 20, 2014

(54) METHOD AND APPARATUS FOR STAGGERING INTERNET PROTOCOL TELECONFERENCING CALLS

(71) Applicant: AT&T Intellectual Property II, L.P., Atlanta, GA (US)

(72) Inventors: Marian Croak, Fair Haven, NJ (US); Hossein Eslambolchi, San Diego, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,783

(22) Filed: Apr. 1, 2013

(65) Prior Publication Data

US 2013/0223291 A1 Aug. 29, 2013

Related U.S. Application Data

(63) Continuation of application No. 11/239,761, filed on Sep. 30, 2005, now Pat. No. 8,411,668.

(51) Int. Cl.
| | |
|---|---|
| *H04L 12/66* | (2006.01) |
| *H04L 12/26* | (2006.01) |
| *H04L 12/16* | (2006.01) |
| *H04Q 11/00* | (2006.01) |
| *G01R 31/08* | (2006.01) |
| *H04M 3/00* | (2006.01) |
| *H04M 1/00* | (2006.01) |
| *H04M 3/42* | (2006.01) |
| *H04L 12/56* | (2006.01) |
| *H04L 29/06* | (2006.01) |

(52) U.S. Cl.
CPC ............. *H04L 47/70* (2013.01); *H04L 47/10* (2013.01); *H04L 65/1069* (2013.01); *H04L 65/403* (2013.01)
USPC .......................................................... 370/352

(58) Field of Classification Search
CPC ..... H04L 47/70; H04L 47/10; H04L 65/1069; H04L 65/403
USPC ................. 370/259–263, 352–356; 709/204; 379/158, 202.01
See application file for complete search history.

(56) References Cited

U.S. PATENT DOCUMENTS

| | | | |
|---|---|---|---|
| 6,333,931 B1 * | 12/2001 | LaPier et al. .................. | 370/385 |
| 6,375,591 B1 | 4/2002 | Wakahara et al. | |
| 6,614,900 B1 | 9/2003 | Champoux | |
| 6,650,619 B1 | 11/2003 | Schuster et al. | |
| 6,697,357 B2 | 2/2004 | Emerson, III | |
| 6,707,792 B1 | 3/2004 | Volftsun et al. | |

(Continued)

*Primary Examiner* — Asad Nawaz
*Assistant Examiner* — Wutchung Chu

(57) ABSTRACT

A method and apparatus for enabling providers of PSTN toll free services to stagger simultaneous transmission of call setup signaling messages into an IP based teleconference bridge, supported by a VoIP network, by suspending a subset of calls and placing them on hold while placing other calls to be connected to the conference bridge are disclosed. The PSTN network can stagger calls by limiting the number of call setup signaling messages to be sent to the VoIP network within a predefined period of time interval and spread all the calls over multiple of such predefined periods. Prerecorded announcements or music can be played while the calls that have been placed on hold are in queue.

20 Claims, 4 Drawing Sheets

(56) References Cited

U.S. PATENT DOCUMENTS

| | | |
|---|---|---|
| 6,845,155 B2 | 1/2005 | Elsey |
| 7,113,987 B2 | 9/2006 | Nabkel et al. |
| 7,567,662 B1 | 7/2009 | Renner et al. |
| 7,584,472 B1* | 9/2009 | McCormick et al. ......... 718/100 |
| 7,920,552 B2* | 4/2011 | Whitman, Jr. ................ 370/352 |
| 7,941,175 B1 | 5/2011 | Hoff et al. |
| 2003/0174652 A1 | 9/2003 | Ebata |
| 2004/0057571 A1* | 3/2004 | Browne et al. ........... 379/266.01 |
| 2004/0066923 A1 | 4/2004 | Robinson |
| 2004/0071100 A1* | 4/2004 | Klaghofer ..................... 370/261 |
| 2004/0170266 A1* | 9/2004 | Adams et al. ............ 379/202.01 |
| 2005/0036482 A1 | 2/2005 | Goroshevsky et al. |
| 2006/0234638 A1 | 10/2006 | Mueckenheim et al. |
| 2009/0028114 A1* | 1/2009 | Proctor, Jr. .................... 370/336 |

* cited by examiner

METHOD AND APPARATUS FOR STAGGERING INTERNET PROTOCOL TELECONFERENCING CALLS

This application is a continuation of U.S. patent application Ser. No. 11/239,761, filed Sep. 30, 2005, which is currently allowed and is herein incorporated by reference in its entirety.

The present invention relates generally to communication networks and, more particularly, to a method and apparatus for staggering Internet Protocol (IP) teleconferencing calls via a Public Switched Telephone Network (PSTN) that is in communication with a packet network such as a Voice over Internet Protocol (VoIP) network.

BACKGROUND OF THE INVENTION

Increasingly, providers of teleconferencing services are using IP based teleconference bridges that require teleconference calls to be processed in a packet network infrastructure, e.g., a VoIP network infrastructure. Calls into these IP based conference bridges often originate in the Public Switched Telephone Network (PSTN) via toll free numbers, i.e., traversing the TDM network and crossing over into the VoIP network for termination. Due to the relative newness of the IP based teleconference services and VoIP technologies, adequate capacity to support high volume teleconferences is often not readily available in the new VoIP infrastructures. The capacity limitation issue may result from a high number of simultaneous call setups, originating from a PSTN switch, occurring at the beginning of a high volume conference call.

Therefore, a need exists for a method and apparatus for staggering Internet Protocol (IP) teleconferencing calls via a Public Switched Telephone Network (PSTN).

SUMMARY OF THE INVENTION

In one embodiment, the present invention enables providers of PSTN toll free services to stagger simultaneous transmission of call setup signaling messages into an IP based teleconference bridge, supported by a packet network, e.g., a VoIP network, by suspending a subset of calls and placing them on hold while placing other calls to be connected to the conference bridge. The PSTN network can stagger calls by limiting the number of call setup signaling messages to be sent to the VoIP network within a predefined period of time interval and spread all the calls over multiple of such predefined periods. Prerecorded announcements or music can be played while the calls that have been placed on hold are in queue. A teleconference bridge is a device used to connect multiple call parties onto a single teleconference session.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
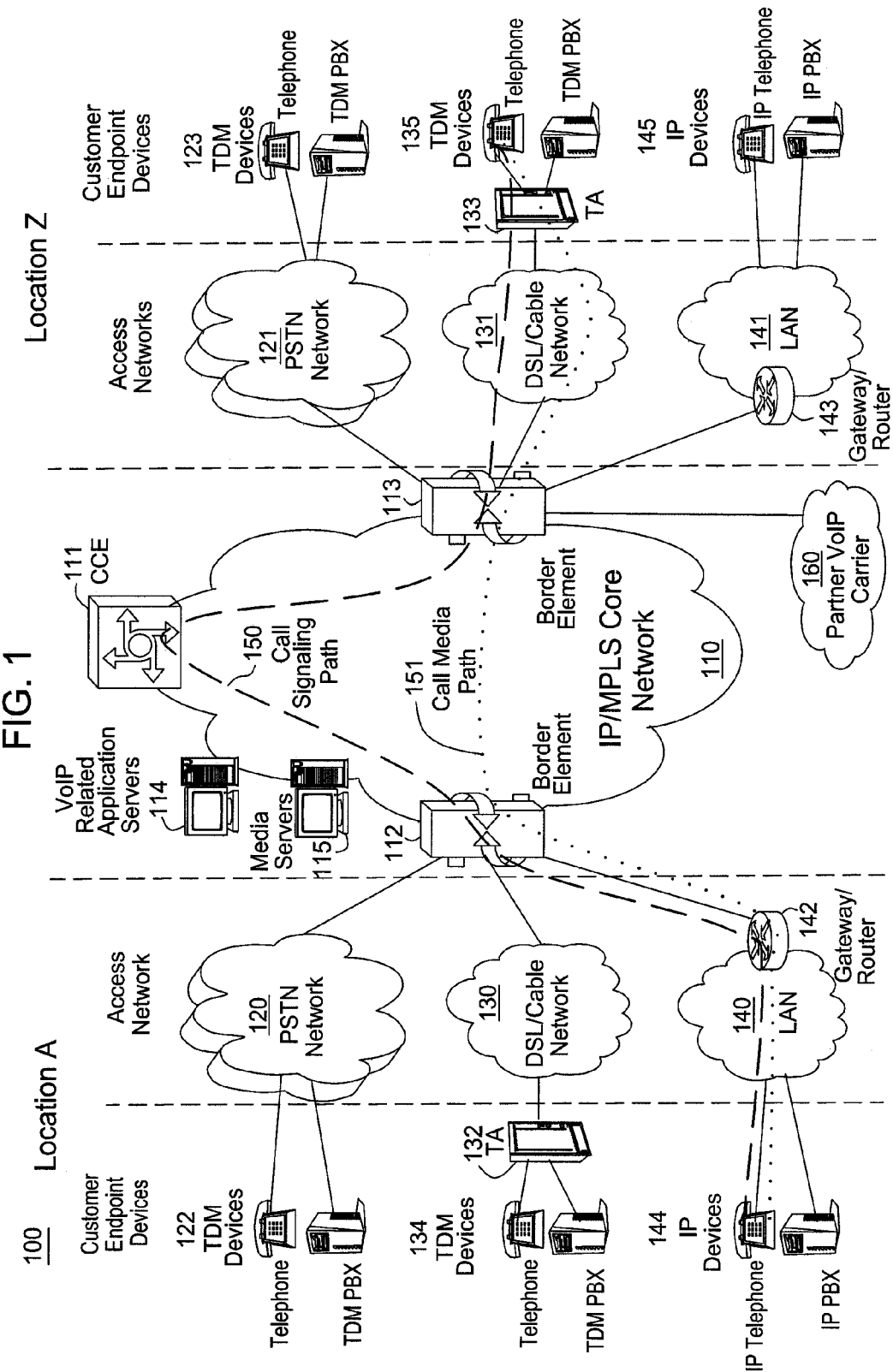
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Increasingly, providers of teleconferencing services are using IP based teleconference bridges that require teleconference calls to be processed in a packet network infrastructure, e.g., a VoIP network infrastructure. Calls into these IP based conference bridges often originate in a Public Switched Telephone Network (PSTN) via toll free numbers, i.e., traversing the TDM network and crossing over into the VoIP network for termination. Due to the relative newness of the IP based teleconference services and VoIP technologies, adequate capacity to support high volume teleconferences is often not readily available in the new VoIP infrastructures. The capacity limitation issue results from a high number of simultaneous call setups, originating from a PSTN switch, occurring at the beginning of a high volume conference call.

To address this criticality, the present invention enables providers of PSTN toll free services to stagger simultaneous transmission of call setup signaling messages into an IP based teleconference bridge, supported by a packet network, e.g., a VoIP network, by suspending a subset of calls and placing them on hold while placing other calls to be connected to the conference bridge. The PSTN can stagger calls by limiting the number of call setup signaling messages to be sent to the VoIP network within a predefined period of time interval and spread all the calls over multiple of such predefined periods. Prerecorded announcements or music can be played while the calls that have been placed on hold are in queue. A teleconference bridge is a device used to connect multiple call parties onto a single teleconference session.

Figure 2:
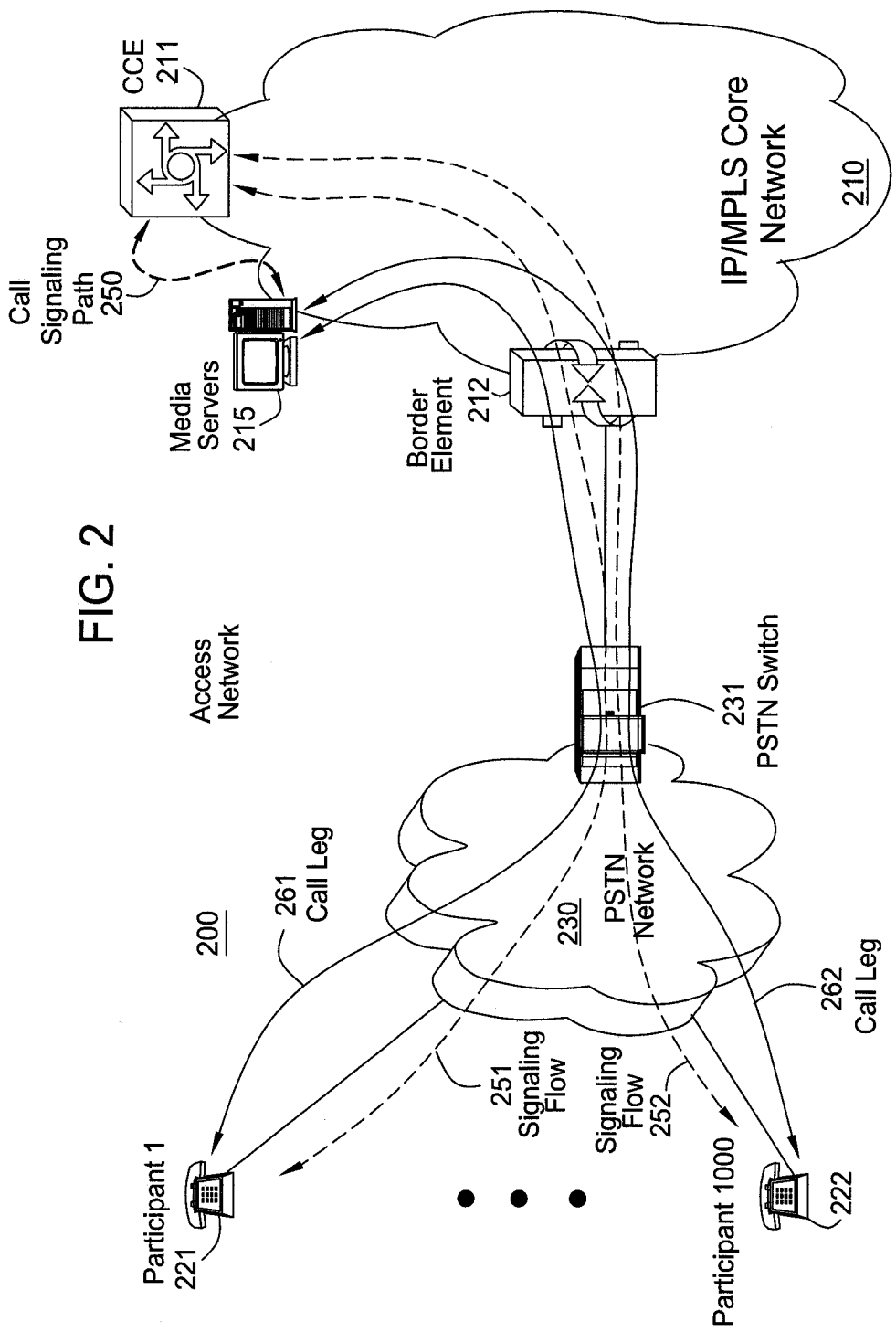
FIG. 2 illustrates an example of staggering Internet Protocol (IP) teleconferencing calls via Public Switched Telephone Network (PSTN) network in a VoIP network of the present invention.

FIG. 2 illustrates an exemplary communication architecture 200 for staggering Internet Protocol (IP) teleconferencing calls via Public Switched Telephone Network (PSTN) in a packet network, e.g., a VoIP network of the present invention. In FIG. 2, a conference call with 1000 participants is scheduled to begin at time T. At time T, all 1000 conference call participants may call in simultaneously, participant 221 is the first caller calling into the conference call and participant 222 is the $1000^{th}$ caller calling into the conference call. All conference call participants use TDM endpoint devices terminated by PSTN network 230 to call into the conference bridge via a pre-assigned toll free number. All such calls are channeled to the VoIP network 210 that provides the IP based conference bridge, i.e. MS 215, via PSTN switch 231 to BE 212 to gain entry to the VoIP network 210. The call made by participant 221 uses signaling flow 251 and the call made by participant 222 uses signaling flow 252. The calls will be handled by CCE 211 for setting up call legs 261, and call leg 262, respectively after verification with media server 215 via flow 250. Since VoIP network elements, such as BE 212 or MS 215, may not have the capability to process 1000 incoming calls simultaneously, PSTN switch 231 staggers these incoming calls into multiple periods of predefined time interval. For instance, if the VoIP network 210 can handle only 100 calls per second via BE 212, then the 1000 incoming calls will be spread out over 10 periods of predefined time interval of 1 second each. Within each predefined 1 second period, PSTN switch 231 will send 100 call setup signaling messages into the VoIP network 210 via BE 212. The predefined time interval and the numbers of call setup signaling message sent into the VoIP network is a configurable parameter set by the provider of PSTN network 230 or negotiated between the two service providers.

To illustrate, the first 100 of the 1000 incoming calls will be sent into the VoIP network for call completion during the first period of the predefined time interval. The call made by participant 221 will be completed during this first period of predefined time interval. After the first 100 of the 1000 incoming calls have been completed during the first period, the second 100 of the 1000 incoming calls will be sent into the VoIP network 210. Similarly, after the second 100 of the 1000 incoming calls have been completed during the second period, the third 100 of the 1000 incoming calls will be sent into the VoIP network 210. The last 100 of the incoming 1000 calls will be sent into the VoIP network 210 for call completion during the $10^{th}$ period of the predefined time interval. The call made by participant 222 will be completed during this last period of predefined time interval. In essence, the 1000 incoming calls that are simultaneously placed at time T will be spread over ten seconds with 100 calls being completed in each one second time interval. While the first 100 of the 1000 incoming calls are being sent by PSTN switch 231 to BE 212, PSTN switch 231 places the remaining 900 of the 1000 incoming calls on hold. While on hold, PSTN network 230 plays special announcements or music to the 900 remaining callers. While the second 100 of the 1000 incoming calls are being sent by PSTN switch 231 to BE 212, PSTN switch 231 places the remaining 800 of the 1000 incoming calls on hold. Similarly, while on hold, PSTN network 230 plays special announcements or music to the 800 remaining callers. PSTN network continues to provide special announcements or music to callers on hold until all calls have been completed.

Figure 3:
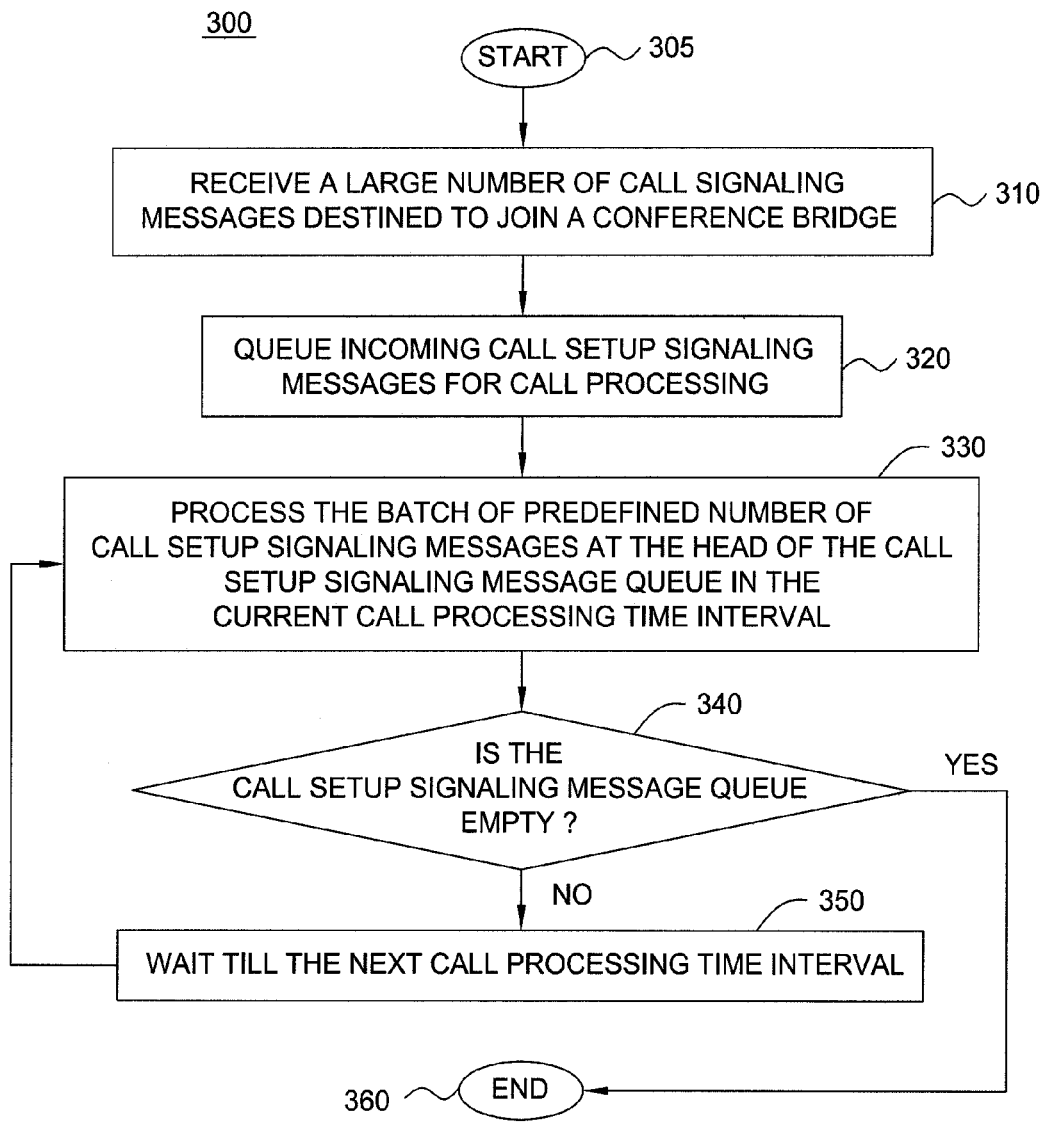
FIG. 3 illustrates a flowchart of a method for staggering Internet Protocol (IP) teleconferencing calls via Public Switched Telephone Network (PSTN) network in a VoIP network of the present invention.

FIG. 3 illustrates a flowchart of a method 300 for staggering Internet Protocol (IP) teleconferencing calls via a Public Switched Telephone Network (PSTN) network. Method 300 starts in step 305 and proceeds to step 310.

In step 310, the method receives a large number of call signaling messages that arrive simultaneously, or in a short period of time, from participants of a conference call to join the conference bridge. In one embodiment, the large number of call signaling messages arrives simultaneously at the PSTN network.

In step 320, the method queues all the incoming call setup messages to be processed. Namely, incoming call setup messages are placed in a queue in the order that they arrived.

In step 330, the method sends a batch of predefined number of call setup messages at the head of the call setup signaling message queue to the VoIP network 210 during a current predefined time interval. The predefined time interval is a configurable parameter set by the PSTN network provider. The predefined number of call setup signaling messages in a batch is also a configurable parameter set by the PSTN network provider.

In step 340, the method checks if the call setup signaling message queue is empty. If the queue is empty, the method proceeds to step 360; otherwise, the method proceeds to step 350.

In step 350, the method waits till the next period of predefined time interval to begin and then returns to step 330. The method ends in step 360.

Figure 4:
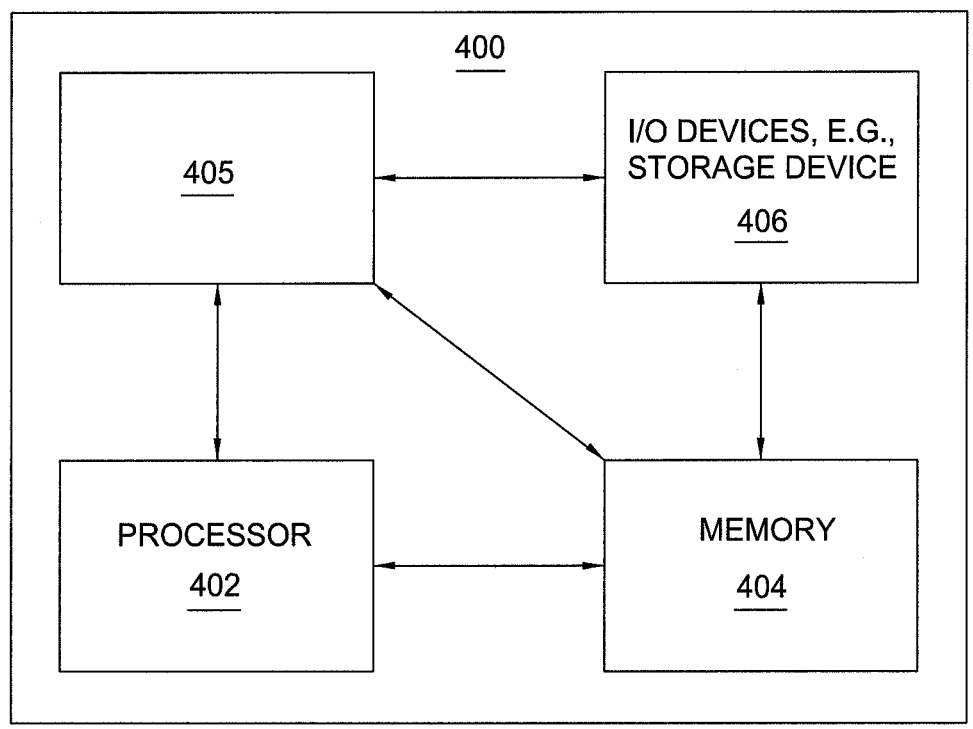
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for staggering IP teleconferencing calls via a PSTN, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for staggering IP teleconferencing calls via a PSTN can be loaded into memory 404 and executed by processor 402 to implement the functions as discussed above. As such, the present process 405 for staggering IP teleconferencing calls via PSTN (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for controlling a flow of a plurality of call setup signaling messages, comprising:
   receiving the plurality of call setup signaling messages by a switch in a time division multiplexing based telephone network, where the plurality of call setup signaling messages is destined to an internet protocol based teleconference bridge located on a packet network; and
   controlling the flow of the plurality of call setup signaling messages by the switch, wherein the controlling comprises:
      assigning the plurality of call setup signaling messages over a plurality of periods of a time interval, wherein the assigning is based on a capacity limitation of the packet network to simultaneously process the call setup signaling messages;
      sending only a number of the plurality call setup signaling messages to the internet protocol based teleconference bridge in each of the plurality of periods of the time interval; and
      placing on hold a remaining number of the plurality of call setup signaling messages that have not yet been sent to the internet protocol based teleconference bridge.

2. The method of claim 1, wherein the packet network is an internet protocol network.

3. The method of claim 1, wherein the internet protocol based teleconference bridge is supported by a media server.

4. The method of claim 1, wherein the number of the plurality call setup signaling messages is a configurable parameter set by an operator of the time division multiplexing based telephone network.

5. The method of claim 1, wherein the time interval is a configurable parameter set by an operator of the time division multiplexing based telephone network.

6. The method of claim 1, wherein the time division multiplexing based telephone network provides an announcement to callers who originate the remaining number of the plurality of call setup signaling messages that are still on hold.

7. The method of claim 6, wherein the announcement comprises music.

8. A non-transitory computer-readable medium storing a plurality of instructions which, when executed by a processor of a switch, cause the processor to perform operations for controlling a flow of a plurality of call setup signaling messages, the operations comprising:

receiving the plurality of call setup signaling messages by the switch in a time division multiplexing based telephone network, where the plurality of call setup signaling messages is destined to an internet protocol based teleconference bridge located on a packet network; and controlling the flow of the plurality of call setup signaling messages by the switch, wherein the controlling comprises:

assigning the plurality of call setup signaling messages over a plurality of periods of a predefined time interval, wherein the assigning is based on a capacity limitation of the packet network to simultaneously process the call setup signaling messages;

sending only a predefined number of the plurality call setup signaling messages to the internet protocol based teleconference bridge in each of the plurality of periods of the predefined time interval; and placing on hold a remaining number of the plurality of call setup signaling messages that have not yet been sent to the internet protocol based teleconference bridge.

9. The non-transitory computer-readable medium of claim 8, wherein the packet network is an internet protocol network.

10. The non-transitory computer-readable medium of claim 8, wherein the internet protocol based teleconference bridge is supported by a media server.

11. The non-transitory computer-readable medium of claim 8, wherein the number of the plurality call setup signaling messages is a configurable parameter set by an operator of the time division multiplexing based telephone network.

12. The non-transitory computer-readable medium of claim 8, wherein the time interval is a configurable parameter set by an operator of the time division multiplexing based telephone network.

13. The non-transitory computer-readable medium of claim 8, wherein the time division multiplexing based telephone network provides an announcement to callers who originate the remaining number of the plurality of call setup signaling messages that are still on hold.

14. The non-transitory computer-readable medium of claim 13, wherein the announcement comprises music.

15. An apparatus for controlling a flow of a plurality of call setup signaling messages, comprising:

a processor of a time division multiplexing based telephone network switch; and a computer-readable medium storing a plurality of instructions which, when executed by the processor, cause the processor to perform operations, the operations comprising:

receiving the plurality of call setup signaling messages, where the plurality of call setup signaling messages is destined to an internet protocol based teleconference bridge located on a packet network; and controlling the flow of the plurality of call setup signaling messages by the switch, wherein the controlling comprises:

assigning the plurality of call setup signaling messages over a plurality of periods of a predefined time interval, wherein the assigning is based on a capacity limitation of the packet network to simultaneously process the call setup signaling messages;

sending only a predefined number of the plurality call setup signaling messages to the internet protocol based teleconference bridge in each of the plurality of periods of the predefined time interval; and placing on hold a remaining number of the plurality of call setup signaling messages that have not yet been sent to the internet protocol based teleconference bridge.

16. The apparatus of claim 15, wherein the packet network is an internet protocol network.

17. The apparatus of claim 15, wherein the internet protocol based teleconference bridge is supported by a media server.

18. The apparatus of claim 15, wherein the number of the plurality of call setup signaling messages and the time interval are both configurable parameters set by an operator of the time division multiplexing based telephone network.

19. The apparatus of claim 15, wherein the time division multiplexing based telephone network provides an announcement to callers who originate the remaining number of the plurality of call setup signaling messages that are still on hold.

20. The apparatus of claim 19, wherein the announcement comprises music.

* * * * *